(12) United States Patent
Lee et al.

(10) Patent No.: US 9,250,071 B2
(45) Date of Patent: Feb. 2, 2016

(54) MEASUREMENT APPARATUS AND CORRECTION METHOD OF THE SAME

(75) Inventors: Hyun-ki Lee, Daegu (KR); Dal-An Kwon, Gunpo-si (KR); Jeong-Yul Jeon, Seongnam-si (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 339 days.

(21) Appl. No.: 13/879,539

(22) PCT Filed: Oct. 13, 2011

(86) PCT No.: PCT/KR2011/007622
§ 371 (c)(1),
(2), (4) Date: Apr. 15, 2013

(87) PCT Pub. No.: WO2012/050375
PCT Pub. Date: Apr. 19, 2012

(65) Prior Publication Data
US 2013/0222579 A1 Aug. 29, 2013

(30) Foreign Application Priority Data
Oct. 13, 2010 (KR) .................. 10-2010-0099607

(51) Int. Cl.
*G01C 11/02* (2006.01)
*G01B 11/06* (2006.01)

(52) U.S. Cl.
CPC ............ *G01C 11/02* (2013.01); *G01B 11/0608* (2013.01)

(58) Field of Classification Search
CPC ........................... G01C 11/02; G01B 11/0608
See application file for complete search history.

(56) References Cited

U.S. PATENT DOCUMENTS

| 5,144,363 A | * | 9/1992 | Wittekoek et al. ............... 355/53 |
| 5,674,650 A | * | 10/1997 | Dirksen et al. .................. 430/22 |
| 6,525,817 B1 | * | 2/2003 | Taniguchi et al. ............ 356/399 |

(Continued)

FOREIGN PATENT DOCUMENTS

| JP | 06-260393 | 9/1994 |
| JP | 2003-017536 | 1/2003 |

(Continued)

OTHER PUBLICATIONS

International Search Report for International Application No. PCT/KR2011/007622, dated May 11, 2012.

(Continued)

*Primary Examiner* — Jefferey Harold
*Assistant Examiner* — Sean Haiem
(74) *Attorney, Agent, or Firm* — Kile Park Reed & Houtteman PLLC (57) ABSTRACT

A measurement apparatus for measuring a substrate, on which a measurement object is formed, and a correction method of the same is shown. The correction method includes measuring a reference phase by measuring a phase of a substrate for measuring the reference phase by using an image-capture part, acquiring a tilted pose of a reference plane of the measured reference phase to an image plane of the image-capture part, and calculating a height that is required to correct the reference plane with regard to the image-capture part based on the tilted pose. Therefore, based on a tilted pose of a reference phase in order to correct a reference plane being a reference of measuring a height, a measurement credibility of the measurement object may be improved.

17 Claims, 8 Drawing Sheets

(56) References Cited

U.S. PATENT DOCUMENTS

| | | | |
|---|---|---|---|
| 7,936,521 B2 * | 5/2011 | Arnold et al. | 359/718 |
| 2006/0060781 A1 * | 3/2006 | Watanabe et al. | 250/310 |
| 2008/0075324 A1 * | 3/2008 | Sato et al. | 382/106 |

FOREIGN PATENT DOCUMENTS

| | | |
|---|---|---|
| JP | 2003-097931 | 4/2003 |
| JP | 2007-129303 | 5/2007 |
| JP | 2007-288724 | 11/2007 |
| KR | 100808536 | 2/2008 |
| KR | 10-2009-0103152 | 10/2009 |
| KR | 10-2010-0108877 | 10/2010 |

OTHER PUBLICATIONS

PCT International Preliminary Report on Patentability and Written Opinion of the International Searching Authority for International Application No. PCT/KR2011/007622, dated Nov. 5, 2012.

* cited by examiner

MEASUREMENT APPARATUS AND CORRECTION METHOD OF THE SAME

TECHNICAL FIELD

The present invention relates to a measurement apparatus and a correction method of the same, more particularly to a measurement apparatus that accurately measures a measurement object formed on a substrate and a correction method of the measurement apparatus to correct a systematic distortion.

BACKGROUND ART

Generally, an electronic device has a substrate to control the operation of the electronic device. Especially, an electronic device having a substrate that has a central processing unit (CPU) to central-control the electronic device. The CPU is an important part of the electronic device, so to check the credibility of the CPU, an inspection test should be performed to test whether the CPU is properly on the substrate.

Recently, in order to measure a substrate, on which a measurement object is formed, a measurement apparatus having a projection part that includes an illuminating-source and a lattice-device to provide a pattern-light towards a measurement object and, an image-capture part that image-captures a pattern-image by providing a pattern-light, is used to inspect a substrate having a measurement object.

However, while inspecting a substrate having a measurement object, a distortion of the inspection data may occur due to an optical system itself having a distortion of the optical system that is installed in the measurement apparatus. In addition, a distortion of the inspection data may also occur by a tilted pose of the substrate due to the image plane of the image-capture part and a plane of the measurement object on a substrate may not be parallel due to two-dimensional measurement that does not consider a tilted pose of the substrate.

DETAILED DESCRIPTION OF THE INVENTION

Objects of the Invention

Therefore, the present invention is to solve the problem, and the object of the present invention is to provide a correction method of a measurement apparatus to improve a credibility of a measurement data by correcting a systematic distortion of the measurement apparatus.

Technical Solution

In an exemplary embodiment, a correction method of a measurement apparatus includes acquiring an image by image-capturing a calibration substrate, on which a plurality of patterns are formed, with an image-capture part that has a camera and an image-capture lens, acquiring a distance information between the plurality of patterns from the acquired image, reading a reference data of the calibration substrate, acquiring a pose information of the calibration substrate by using the acquired distance information between the plurality of patterns and the distance information between the plurality of patterns in the reference data, and calibrating the image-capture part by using the pose information and the reference data of the calibration substrate.

For example, the image-capture lens may include a telecentric lens.

Acquiring a pose information may include determining whether a slope of the calibration substrate is positive or negative by comparing sizes of at least two patterns of the plurality of patterns.

For example, the image-capture part may be calibrated by using an average value of calibration data that are acquired by measuring at least two poses of the calibration substrate.

In other exemplary embodiment, a correction method of a measurement apparatus includes a method of correcting a distortion of an optical system of a measurement apparatus measuring a measurement object with an image-capture part by using the optical system having a spherical lens and a non-spherical lens, the correction method of a measurement apparatus includes acquiring an image by image-capturing a substrate on which a plurality of patterns are formed and dividing the acquired image into a plurality of sub-regions, and compensating a distortion of each sub-region.

For example, the non-spherical lens may include a beam splitter having a plate-shape.

Compensating a distortion of each sub-region may include acquiring a compensating condition that minimizes the distortion of the sub-region by using pattern-compensating values, the pattern-compensating value corresponding to each of the patterns included in the sub-region.

After compensating a distortion of each sub-region by a plurality of times while changing a shape of the sub-region, wherein the shape of the sub-region may be decided based on the acquired compensation data.

In another exemplary embodiment, a correction method of a measurement apparatus includes measuring a reference phase by measuring a phase of a substrate for measuring the reference phase by using an image-capture part, acquiring a tilted pose of a reference plane of the measured reference phase to an image plane of the image-capture part, and calculating a height that is required to correct the reference plane with regard to the image-capture part based on the tilted pose.

Acquiring a tilted pose of a reference plane of the measured reference phase to an image plane of the image-capture part may include measuring a substrate for measuring pose information by using the image-capture part to acquire a substrate plane of the substrate for measuring pose information, measuring a phase of the substrate for measuring pose information to acquire a height based on the reference phase, and comparing the substrate plane of the substrate for measuring pose information and the height of the substrate for measuring pose information to acquire a tilted pose of the reference plane of the measured reference phase.

Acquiring a tilted pose of a reference plane of the measured reference phase may include calculating a height of the substrate plane from a predetermined ideal reference plane that is parallel with the image plane, and acquiring a tilted pose of the reference plane of the reference phase based on the height of the substrate plane and the height of the substrate.

Acquiring a substrate plane of a substrate for measuring pose information may include measuring the substrate for measuring pose information having a plurality of indication marks by using the image-capture part and measuring a distance between the indication marks, to calculate a tilted pose of the substrate for measuring pose information.

In an exemplary embodiment, a measurement apparatus includes at least one projecting part that provides a pattern-light toward a substrate on which a measurement object is formed, an illumination part that provides a light toward the substrate, an image-capture part disposed on an upper part of the substrate to image-capture the substrate, and a beam splitter disposed between the image-capture part and the substrate to partially reflect the light from the illumination part to face the substrate and partially transmit the light, a reflectivity and a transmissivity of the beam splitter being asymmetric. Wherein the transmissivity of the beam splitter is greater than the reflectivity.

The light exiting the illumination part is reflected by the beam splitter and provided to the measurement object, and a light that is reflected from the measurement object retransmits the beam splitter and enters the image-capture part to form a coaxial lighting system in the measurement apparatus.

Advantageous Effects

According to a measurement apparatus and a correction method of the same, a focal length of an image-capture part is corrected and a distortion that is occurred by a non-uniformity of an optical system such as a sphere lens and a beam splitter installed inside a measurement apparatus is compensated, in order to improve a measurement credibility of a measurement object.

In addition, a calibration substrate having a plurality of patterns is measured to acquire a pose information of a calibration substrate based on the distance information between the measured pattern, to acquire accurate calibration data such as a focal length and a magnification of an image-capture part.

In addition, a pose information of an object and a PMP measurement apparatus is used to calibrate a tilt between an image plane and a reference plane that is a reference of a height measurement, to improve a measurement credibility of the measurement data.

In addition, transmissivity of a beam splitter is set higher than a reflectivity, and thus a use efficiency of a pattern-light that is provided from a projection part may be improved and a pattern-image may be stably image-captured.

In addition, a region error from an image data that is acquired from a height of a measurement object is compensated to improve a measurement accuracy.

In addition, a tilted pose of a measurement apparatus relative to an image plane of an image-capture system is measured to thereby improve a measurement accuracy.

In addition, when a telecentric lens is used to measure an optical system, a tilted pose of a substrate is measured, to improve a measurement accuracy.

In addition, when a telecentric lens is used to measure an optical system, a distortion of measured data is compensated, to improve a measurement accuracy.

EMBODIMENTS OF THE INVENTION

The invention is described more fully hereinafter with reference to the accompanying drawings, in which exemplary embodiments of the invention are shown.

However, this invention may be embodied in many different forms and should not be construed as limited to the embodiments set forth herein Numerical terms such as "one", "two", etc. may be used as cardinal numbers to indicate various structural elements, however, the structural elements should not be limited by the terms. The terms are only used to distinguish one structural element from another structural element. For example, a first structural element may be named as second structural element if the right is not beyond the scope, the same applies to the second structural element that may be named as the first structural element.

The terms used in the present application are only to explain the specific embodiment and is not intended to limit the present invention. The terms "a", "an" and "the" mean "one or more" unless expressly specified otherwise. The terms "including", "comprising", etc., are to designate features, numbers, processes, structural elements, parts, and combined component of the application, and should be understood that it does not exclude one or more different features, numbers, processes, structural elements, parts, combined component.

If not defined differently, all the terms used herein including technical or scientific terms, may be understood same as a person skilled in the art may understand.

Terms that are used herein are same as the terms defined in a commonly-used dictionary may be understood as same a contextual meaning, if not mentioned clearly, may not be understood as excessively or ideally.

The invention is described more fully hereinafter with reference to the accompanying drawings, in which exemplary embodiments of the invention are shown.

Figure 1:
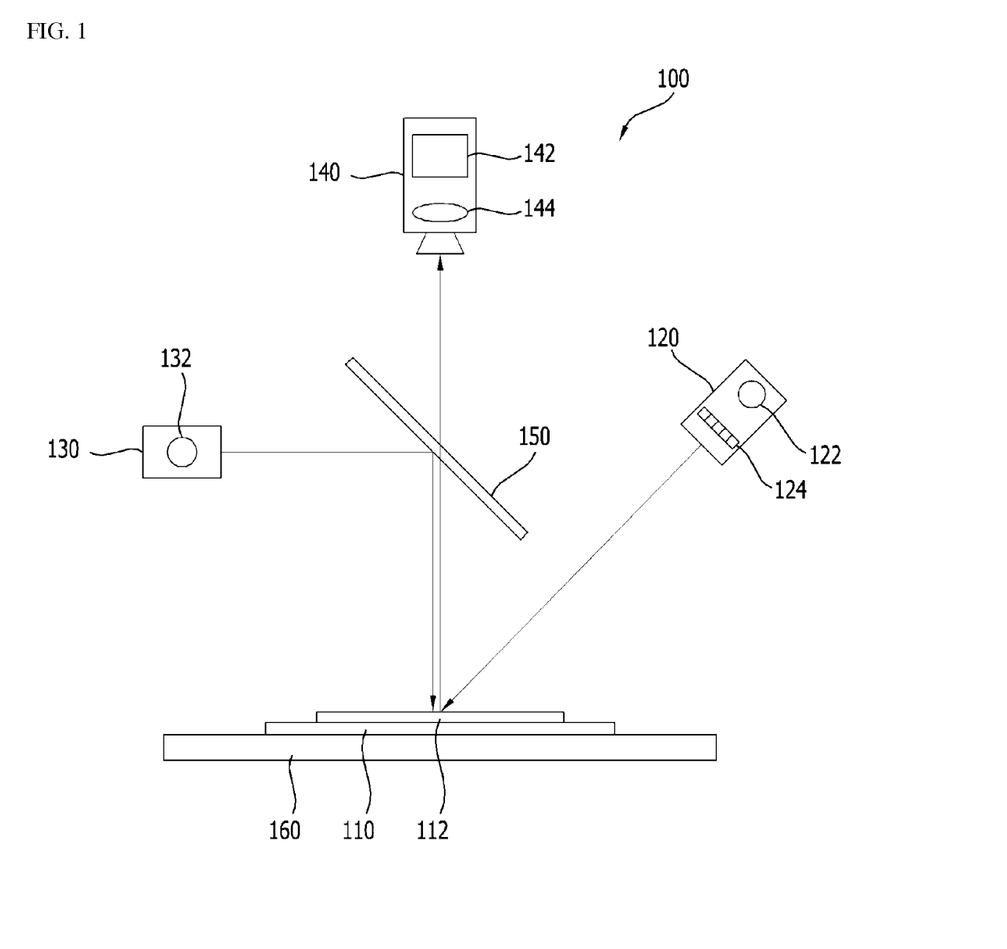
FIG. 1 is a block diagram briefly illustrating of a measurement apparatus according to an embodiment of the present invention.

FIG. 1 is a block diagram briefly illustrating of a measurement apparatus according to an embodiment of the present invention.

Referring to FIG. 1, a measurement apparatus 100 according to an exemplary embodiment of the present invention includes a stage 160 that supports or transfers a substrate 110, on which a measurement object 112 is formed, at least one projection part 120 that provides a pattern-light to the substrate 110, an illumination part 130 that provides a light to the substrate 110, an image-capture part 140 that image-captures an image of the substrate 110, and a beam splitter 150 disposed under the image-capture part 140 that reflects one part of a light that is entered and transmits other part of the light.

The projection part 120 provides the substrate 110 with a pattern-light to measure a three-dimensional shape of the measurement object 110 that is formed on the substrate 110. For example, the projection part 120 includes a light source 122 that emits light, and a lattice-element 124 that converts the light from the light source 124 into a pattern-light. In addition, the projection part 120 may include a lattice-transferring device (not shown) that pitch-transfers the lattice-element 124 and a projection lens (not shown) that projects the pattern-light converted by the lattice-element 124 to a measurement object 112. The lattice-element 124 may be transferred by $2\pi/N$ by using the lattice transferring device such as a piezoelectric actuator (PZT), for the phase-transition of the pattern-light, where N is a natural number greater than or equal to two. A plurality of projection parts 120 having the above-described structure may be installed around the image-capture part 140, and spaced apart from each other at a regular angle along a circumference direction. For example, four projection parts 120 may be installed around the image-capture part 140 in direction of circumference with a distance to have 90° angle. The projection parts 120 are tilted towards the substrate 110 to have a regular angle, and provides a pattern-light to the substrate 110 from various directions.

The illumination part 130 is installed between the image-capture part 140 and the substrate 110, to provide a light towards the beam splitter 150. The illumination part 130 provides a light to the substrate 110 by using a beam splitter 150 to capture a plane image of the substrate, on which the measurement object 112 is formed. The illumination part 130 includes a light source 132 that emits light.

The image-capture part 140 captures a pattern-image of the substrate 110 through the pattern-light that is provided by the projection part 120, and captures a plane image of the substrate 150 through the light provided from the illumination part 130. For example, the image-capture part 140 is installed vertically above from the substrate 150. The image-capture part 140 may include a camera 142 for image-capturing and at least one imaging lens 144 that provides the camera 142 with a light entered from the image-capture part 140. The camera 142 may include a CCD camera or a CMOS camera. For example, the imaging lens 144 may include a telecentric lens that only passes a light that is parallel with the light axis, in order to minimize an image distortion caused by a Z axis.

The beam splitter 150 may be installed between the image-capture part 140 and the substrate 110. The beam splitter 150 reflects one part of the entered light and transmits the other part. Therefore, the light provided from the illumination part 130, one part of the light provided from the illumination part 130 is reflect to the substrate 110 and the other part is transmitted by the beam splitter 150. In addition, one part of the light that is reflected from the substrate 110 transmits the beam splitter 150 to enter the image-capture part 140, and other part is reflected by the beam splitter 150.

Therefore, a scattered light is provided to the measurement object 112 by using the beam splitter 150, and by using a coaxial lighting system a light that is reflected from the measurement object 112 goes through the beam splitter 150 that allows a light reflected from the measurement object 112 to re-enter the image-capture part 140 through the beam splitter 150, a measurement credibility may be improved, in cases such as a measurement object 112 having high surface reflection or a shadow that is generated from a surrounding object. Especially, when the measurement object 112 is a central processing semiconductor device that is used in a Central Processing Unit (CPU), since a surface reflectivity is high and a device thickness is thick, using the coaxial lighting system is very effective.

However, since the beam splitter 150 is located under the image-capture part 140, the pattern-light that is provided from the projection part 120 is reflected by the substrate 110, and the pattern-light heading towards the beam splitter 150 partially transmits the beam splitter 150 to enter the image-capture part 140 the other part of the pattern-light is reflected by the beam splitter 150.

A beam splitter 150 is formed to have an asymmetric characteristic between a reflectivity and a transmissivity by considering an amount of light provided from the illumination part 130 that enters the image-capture part 140 and an amount of light provided from the projection part 120 that enters the image-capture part 140. Especially, the beam splitter 150 is formed to have a transmissivity greater than a reflectivity so that the pattern-light exited from the projection part 120 after being reflected by the substrate 110 may enter the image-capture part 140 as much as possible after being reflected by the substrate 110. For example, a transmissivity and a reflectivity of the beam splitter may be approximately 3:7.

In other words, in order to measure a three-dimensional shape of the measurement object 112, a pattern-light emitted from the projection part 120 is provided to the substrate 110 and a pattern-light reflected from the substrate 110 is captured by the image-capture part 140, however, since the beam splitter 150 is installed under the image-capture part 140, only a partial of the pattern-light reflected from the substrate 110 transmits the beam splitter 150 and enter the image-capture part 140, and the other partial of the pattern-light reflected from the substrate is reflected by the beam splitter 150 causing a loss. When an amount of light that enters the image-capture part 140 is too low, measuring a three-dimensional shape may be difficult, in order to reduce a loss light by the beam splitter 150, and to increase an amount of light entering the image-capture part 140, having a transmissivity of the beam splitter 150 greater than a reflectivity is preferred.

Therefore, when a transmissivity of the beam splitter 150 is greater than a reflectivity, an amount of light provided from the illumination part 130 passes the beam splitter 150 twice and enters the image-capture part 140, may be reduced, however, this hardly affects when measuring the measurement object. Meanwhile, a pattern-light provided from the projection part 120 passes the lattice-device 124 causing a reduction of an amount of the pattern-light, so increasing a transmissivity of the beam splitter 150 by increasing an amount of light that is provided to the image-capture part 140 is preferred.

Meanwhile, in order to accurately measure the measurement object 112 that is formed on the substrate 110 by using the measurement apparatus 100 having the composition as above, an systematic correction of the measurement apparatus 110 is necessary.

Figure 2:
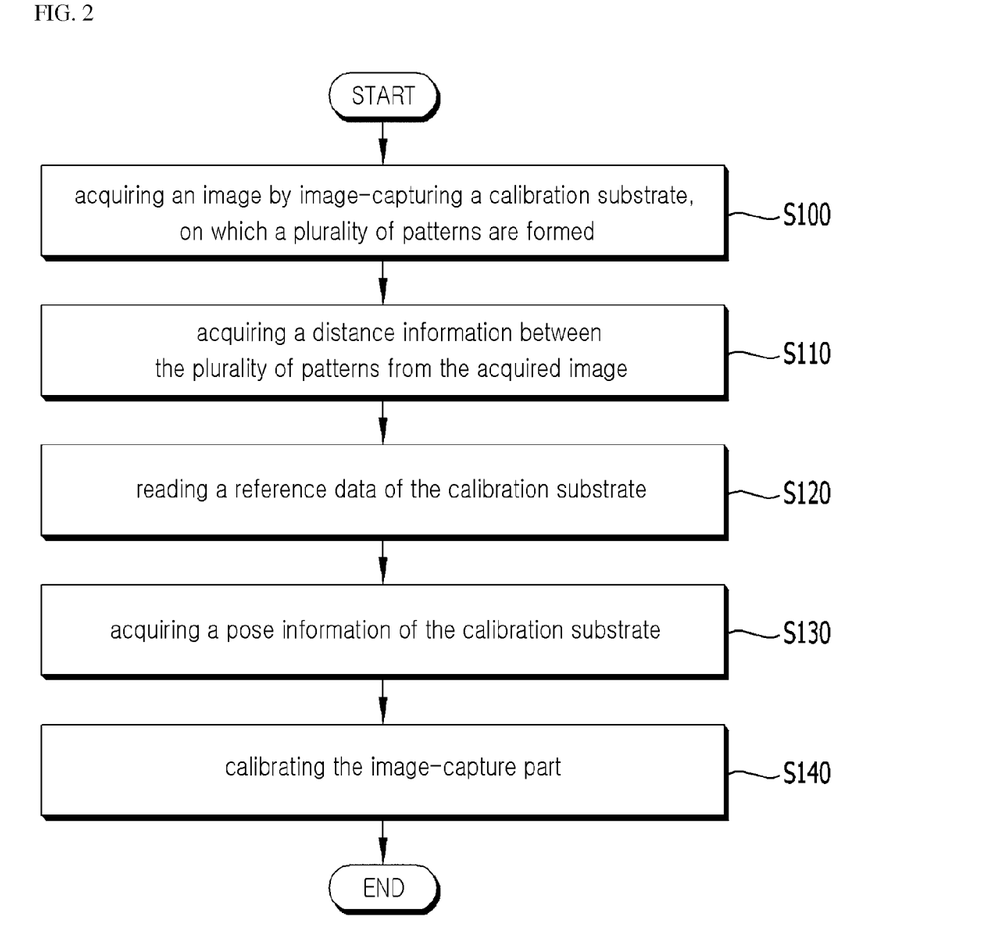
FIG. 2 is a flow chart illustrating a correction method of a measurement apparatus according to an embodiment of the present invention.
Figure 3:
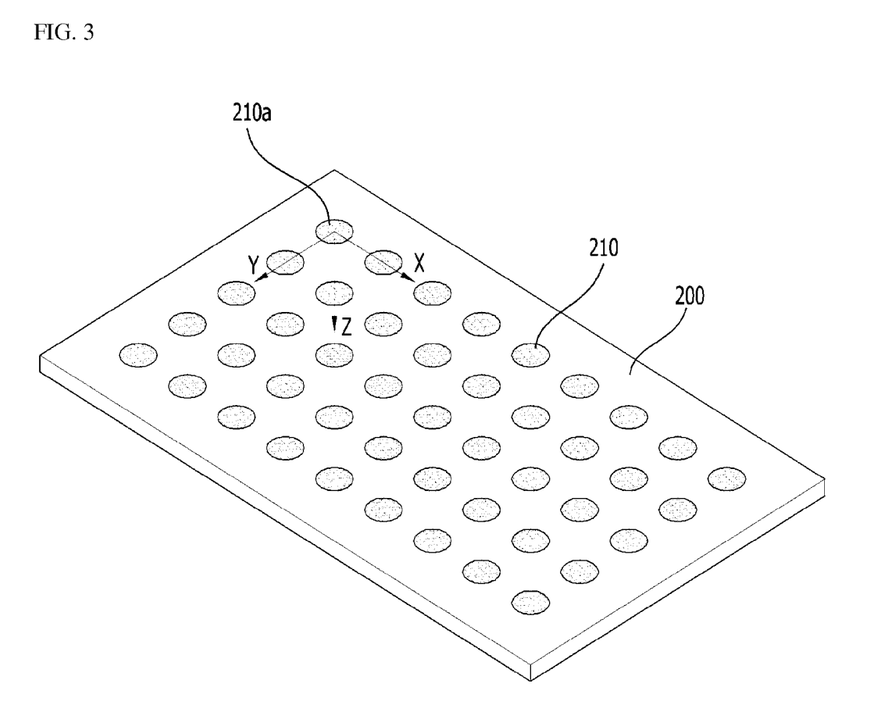
FIG. 3 is a perspective view illustrating a calibration substrate.
Figure 4:
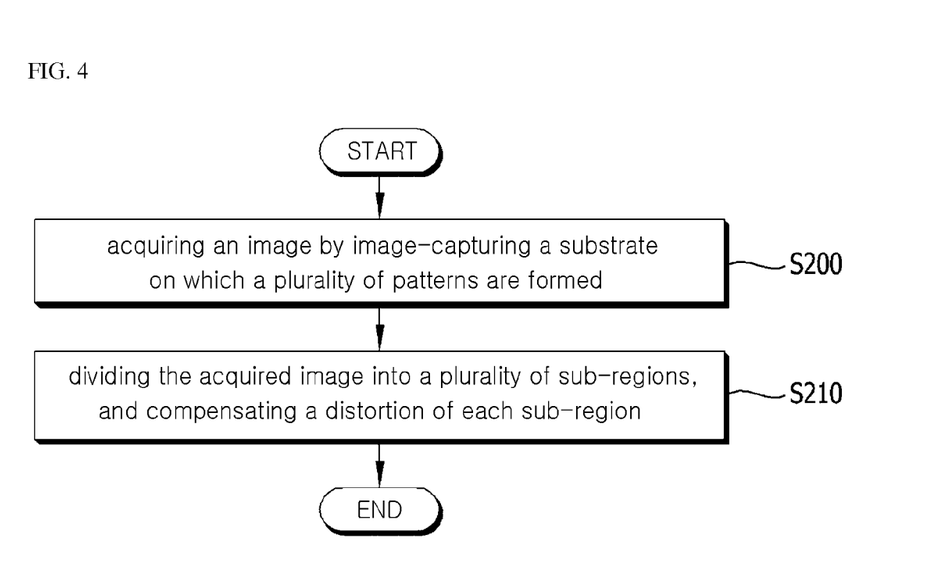
FIG. 4 is a flow chart illustrating a measurement apparatus according to another embodiment of the present invention.

FIG. 2 is a flow chart illustrating a correction method of a measurement apparatus according to an embodiment of the present invention. FIG. 3 is a perspective view illustrating a calibration substrate. FIG. 4 is a flow chart illustrating a measurement apparatus according to another embodiment of the present invention.

Referring to FIG. 1, FIG. 2, and FIG. 3, a calibration method of the image-capture part 140, measures a distance between a plurality of patterns that are formed on a calibration substrate 200, and calibrates the image-capture part based on a distance information between the plurality of patterns from a reference data of the calibration substrate 200 and the measured distance information between the plurality of patterns 210.

In this case, the calibration substrate 200 and an image plane of the image-capture part may be tilted not being parallel. Therefore, it is necessary to correct an error of the distance information of the plurality of patterns 210 caused by the tilted pose of the image plane and the calibration substrate 200.

In order to correct the error caused by the tilt of the calibration substrate 200, the image-capture part 140 having the camera 142 and the image-capture lens 144 image-captures the calibration substrate 200, on which a plurality of patterns are formed, to acquire an image in step S100. In this case, the image-capture lens 144 may include a sphere lens, for example, the sphere lens may include a telecentric lens that only passes a light that is parallel with the light axis, in order to minimize an image distortion caused by a Z axis.

Then, a distance information between the plurality of patterns 210 from the acquired image by using the image-capture part is acquired as in S110. For example, one pattern 210*a* of the plurality of patterns 210 is used as a reference to calculate a X axis or a Y axis of separate distance from the other patterns, in order to acquire the distance information between the plurality of patterns 200.

Meanwhile, beside acquiring the distance information between the plurality patterns 210 from the acquired image by using the image-capture part 140, the measurement apparatus 100 may also read a reference data (for example, a CAD data) of the calibration substrate 200 in S120. The reference data includes a distance information between the plurality of patterns 210.

Then, a pose information showing a tilted pose of the calibration substrate 200 is acquired by using the distance information between the plurality of patterns 210 acquired from the image-capture part 140 and a corresponding of the distance information between the plurality of patterns 210 from the reference data in S130. The tilted pose of the calibration substrate 200 is a relative pose to an image plane of the image-capture part 140. For example, the distance information between the plurality of patterns 210 measured by using the image-capture part 140 and the distance information between the known plurality of patterns 210 from the reference data (for example, a CAD data) of the calibration substrate 200 are compared to calculate a tilted angle of the calibration substrate 200.

Meanwhile, various shapes of the calibration substrate 200 may be measured at least twice and by using an average value of the measured distances the image-capture part 140 may be calibrated. In other words, a pose and a position of the calibration substrate 200 may be changed to acquire the distance information between the plurality of patterns 210, then by comparing the distance information between the plurality of patterns 210 and the reference data of the calibration substrate 200 that relates to the distance information between the plurality of patterns 210, a relatively tilted angle between a substrate plane of the calibration substrate 200 and the image plane of the image-capture part 140 may be calculated based on at least on of a pose information that has a lowest error between the compared results or an average pose information between the compared results.

Meanwhile, while acquiring the pose information of the calibration substrate 200, at least two patterns of the patterns 210 that is measured by using the image-capture part 140 are compared, to determine whether a slope of the calibration substrate 200 is positive or negative. It is preferred to compare sizes between two patterns that are relatively far away in a diagonally direction.

Thereafter, the image-capture part 140 is calibrated by using the pose information of the calibration substrate 200 and the known reference data of the calibration substrate 200 in step S140. For example, the pose information and the reference data is substituted to an image-capture part matrix equation mathematically defining characteristic of the image-capture part 140, and thus, a calibration data such as a focal distance information and/or a scale information, etc. of the image-capture part 140, which corresponds to an unknown. In this case, in order to improve an accuracy of the calibration data, an average value of calibration data that is acquired by measuring at least two poses of the calibration substrate 200 may be used to perform a calibration of the image-capture part 140.

Therefore, a calibration of the image-capture part 140 is performed by considering the pose information of the calibration substrate 200 and is used to measure the measurement object to improve a measurement accuracy.

FIG. 4 is a flow chart illustrating a measurement apparatus according to another embodiment of the present invention. Especially, FIG. 4 is a correction method of a non-sphere lens installed in the measurement apparatus.

Referring to FIG. 1 to FIG. 4, the measurement apparatus 100 according to an exemplary embodiment of the present invention measures a three-dimensional shape of the measurement object by using an optical system that includes the image-capture lens 144 (for example, a telecentric lens), disposed in the image-capture part 140, and the beam splitter 150 installed below the image-capture part (the beam splitter is a kind of a non-sphere lens).

In this case, due to the optical system itself having non-uniformity, a distortion may occur to the image-captured image. Therefore, compensating a distortion caused by the optical system is necessary.

Meanwhile, the optical system may include a sphere lens and a non-sphere lens, an error caused by the sphere lens may generally have a regular distortion and a non-sphere lens may have an irregular distortion. Therefore, when an error of the optical system is compensated, an entire distortion of the sphere lens and the non-sphere lens may be compensated or each of the error of the sphere lens and the non-sphere lens may be compensated.

The measurement apparatus of an exemplary embodiment of the present invention, the image-capture lens 144 includes a sphere lens, however, a non-uniformity of the sphere lens may cause a distortion of an image-captured image. Therefore, before measuring the measurement object 112, an optical system installed in the measurement apparatus 100 is corrected to compensate an distortion caused by a non-uniformity of the image-capture lens 144 having the sphere lens. The compensation method of the sphere lens is a general technique, so further description of the method is omitted.

Meanwhile, the distortion caused by a non-sphere lens installed in the measurement apparatus 100 needs to be compensated. For example, the non-sphere lens may be a beam splitter 150. The beam splitter 150 is formed as a plate-shape and both sides have a coating layer. A refractive index of the beam-splitter 150 may be different according to region causing a distortion of an image-captured image.

Figure 5:
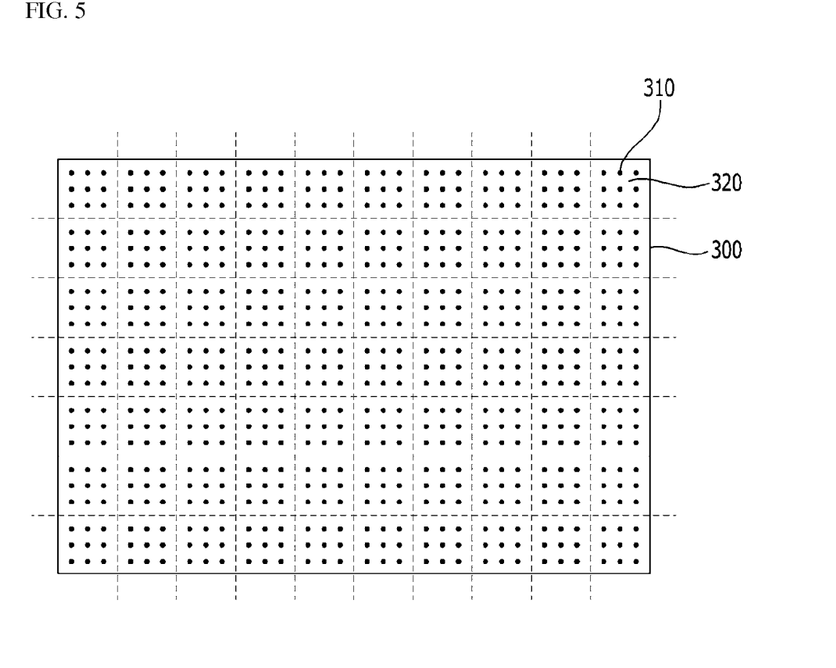
FIG. 5 is a conceptual view describing a correction method of a distortion caused by a non-spherical lens.

FIG. 5 is a conceptual view describing a correction method of a distortion caused by a non-spherical lens.

Referring to FIG. 1, FIG. 4, and FIG. 5, to compensate an error caused by the non-uniformity of the non-sphere lens, a substrate 300, on which a plurality of patterns 310 are formed, is image-captured with the image-capture part 140 to acquire an image of the substrate 300 in S200. After, the image-captured image of the substrate 300 by using the image-capture part 140 is divided into a plurality of sub-regions 320, and each of the sub-regions 320 are applied with a different compensating condition to compensate a distortion in S210. For example, an image of the substrate 300 may be divided into sub-regions 320 having lattice-shape.

The compensating condition applied to each of the sub-regions 320 may be specialized to the sub-region 320 by using a pattern compensation values that corresponding to each of the patterns included in the sub-region 320. For example, a location of the patterns 310 in the reference data (For example, a CAD data) of the substrate 300 and a location of the patterns of the image-captured image are compared to calculate an error value (in other words, a compensation value) between the patterns 310, then a compensating condition is set by calculating a value that has minimized error of the pattern compensating value of the pattern 310 in the each of sub-regions 320, or an average value between the pattern compensating value.

Meanwhile, after compensating a distortion of each sub-region by a plurality of times while changing a shape of the sub-region, the shape of the sub-region 320 may be decided based on the acquired compensation data. For example, while changing sizes of the lattice-shaped sub-region 320 to small or large, specialized compensating condition of different sizes of the sub-region 320 are applied, and based on the result a sub-region shape having the least distortion value is selected, to optimize the sub-region 320.

In addition, compensating a distortion of the sub-region 320, by using the pose information acquired during the calibration of the image-capture part 140 of FIG. 2 and FIG. 3, a more accurate distortion compensation of the non-sphere lens may be performed.

Therefore, the distortion caused by the non-uniformity of the optical system of the image-capture lens 144 and the beam splitter 150 that are installed in the measurement apparatus is compensated before a real measurement, a measurement credibility may be improved.

Meanwhile, in a measurement apparatus using a moire measurement system, a height of a measurement object 112 is measured based on a reference plane that is saved in the apparatus. In other words, a substrate for measuring the reference phase is measured and saved in the apparatus, the measured plane of the substrate for measuring the reference phase becomes a reference plane. However, when a relative reference plane is relatively tilted with an image plane of the image-capture part 140, a distortion may occur, so before measuring a height of a measurement object, a new setting of an actual reference plane of the apparatus is necessary. In other words, acquiring a relative error between an ideal reference plane that is parallel with an image plane of the image-capture part and a measured reference plane, to use the error value as a compensating data.

Therefore, by correcting an error of the reference plane that is measured to an image plan of the image-capture part, a measurement error according to a pose of the image-capture part is corrected, so even though the image-capture part is moved to measure a plurality of field of views (FOV), the error between the image plane of the image-capture part and the measured reference plane is not affected, and the image plane of the image-capture part and the measured reference plane may be parallel.

Figure 6:
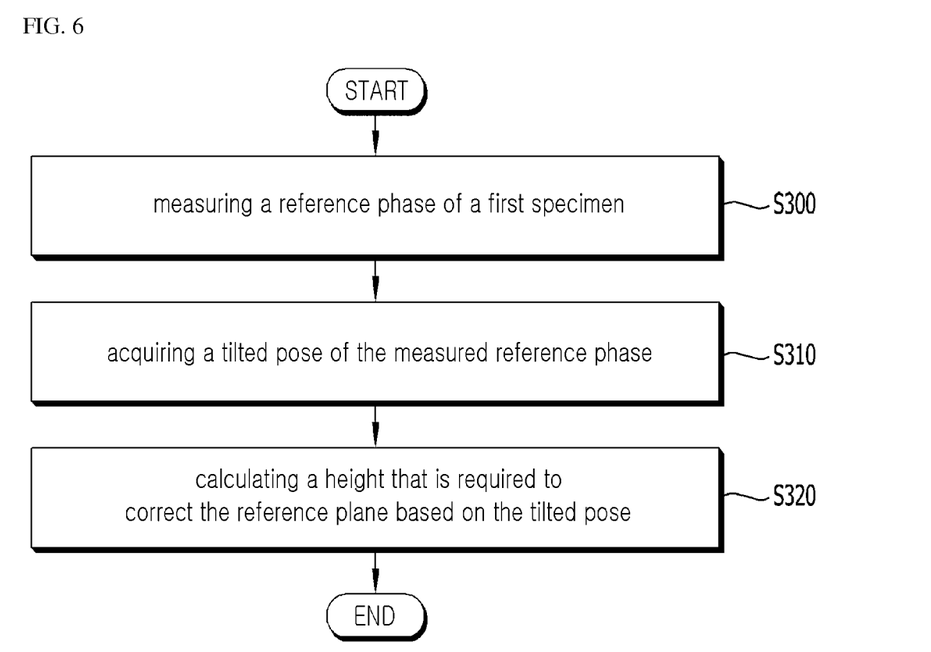
FIG. 6 is a flow chart illustrating a measurement apparatus according to still another embodiment of the present invention.
Figure 7:
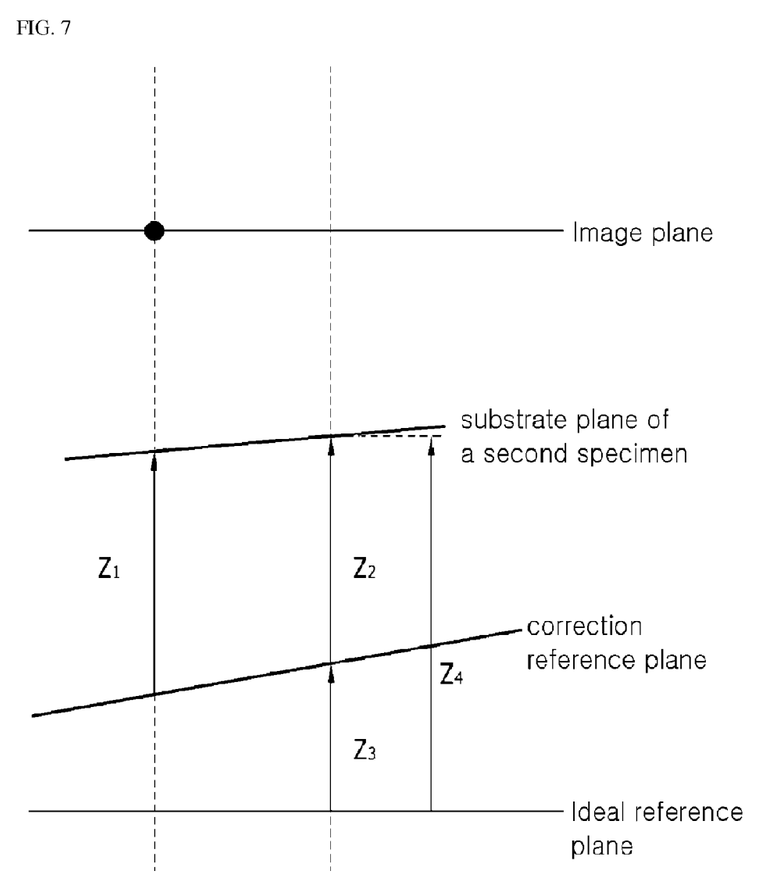
FIG. 7 is a conceptual view describing a correction method of a reference plane of a measurement apparatus of FIG. 6.
Figure 8:
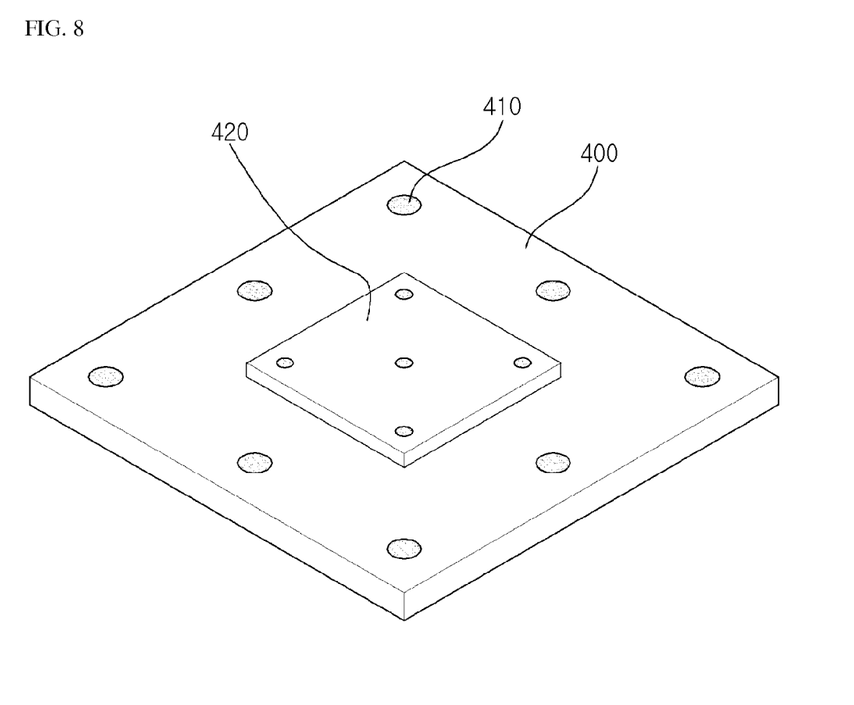
FIG. 8 is a perspective view illustrating a substrate that measures a pose information according to an embodiment of the present invention.

FIG. 6 is a flow chart illustrating a measurement apparatus according to still another embodiment of the present invention. FIG. 7 is a conceptual view describing a correction method of a reference plane of a measurement apparatus of FIG. 6. FIG. 8 is a perspective view illustrating a substrate that measures a pose information according to an embodiment of the present invention.

Referring to FIG. 1, FIG. 6, FIG. 7 and FIG. 8, a correction of a reference plane, a substrate for measuring the reference phase (first specimen) is set at a measurement region of the image-capture part 140, then a reference phase of the substrate for measuring the reference phase is measured in S300. For example, a phase of the substrate for measuring the reference phase is measured through a phase measurement profilometry (PMP) by using the projection part 120.

Then, after a tilted pose of a reference plane of the measured reference phase to an image plane of the image-capture part is acquired in S310.

To acquire the tilted pose of the measured reference phase, a substrate for measuring pose information (second specimen) is set at a measurement region of the image-capture part 140, then the substrate for measuring pose information is measured from the image-capture part 140 to acquire a substrate plane of the substrate for measuring pose information. For example, the substrate for measuring pose information may be a substrate 400 having a plurality of indication marks 410 to verify a tilted pose as in FIG. 8.

The substrate plane of substrate for measuring pose information measures a distance between an indication marks 410 formed on a substrate for measuring pose information, and by using thereof a tilted pose of the substrate 400 for measuring pose information may be calculated. For example, X and Y axis of the indication marks 410 are acquired from an image-captured measured image being image-captured by an image-capture part 140 that has a light provided from a illumination part 130, and Z axis of the indication marks 410 is acquired by measuring a distance between the indication marks 410. In other words, a distance between the measured indication marks 410 and a distance between the indication marks 410 that is known from the reference data (for example, a CAD data) are compared to calculate a tilted slope, to acquire a relative height of the indication marks 410. Meanwhile, the substrate 400 for measuring a pose information may include a protrusion part 420 that protrudes a predetermined height from a central part to determine whether a slope of the substrate is positive or negative. Since a shape of the protrusion part 420 that is image-captured from the image-capture part 140, changes by a positive or negative of a slope of the substrate 400 for measuring a pose information, by using a measurement image of the protrusion part 420 the tilted slope of the substrate for measuring pose information may be determined positive or negative.

Therefore, a plane equation is generated by using the acquired tilted pose of a substrate 400 for measuring pose information, a substrate plane of the substrate 400 for measuring pose information is acquired by using the plane equation, then a tilted pose of the substrate 400 for measuring pose information to the image plane and a height from an reference plane ($Z_4$) are acquired.

Meanwhile, the ideal reference plane is a predetermined plane that is parallel with the image plane, for example, one of a height value from the measured indication marks 410 may be used.

In different, a substrate plane of the substrate 400 for measuring pose information may be known by using the plan equation showing a tilted pose of a substrate 400 for measuring pose information, for example, the plane equation may be acquired from measuring a random location of a three spot on a substrate 400, for example, a Z axis of at least three indication marks 410 may be acquired by laser (not shown).

The acquired X, Y, and Z axis of at least three of the indication marks 410 may be used to generate a plane equation, by using the plane equation a substrate plane of a substrate 400 for measuring pose information is obtained, then a tilted pose of a substrate 400 for measuring pose information against an ideal reference plane being parallel with an image plane and a height ($Z_4$) from the ideal reference plane may be acquired.

Then, after a phase of the substrate 400 for measuring pose information is measured to acquire a height ($Z_1$, $Z_2$) based on the reference phase. The phase of the substrate 400 for measuring pose information may be measured through a phase measurement profilometry (PMP) by using a projection part 120.

Then, after a tilted pose of the measured reference plane of the reference phase is acquired by comparing the reference plane of the substrate 400 for measuring pose information and the height of the substrate 400 for measuring pose information. For example, a height of a reference plane $Z_4$ of a substrate 400 for measuring pose information is calculated from the predetermined ideal reference plane being parallel with an image plane of the image-capture part 140, and based on the height of a reference plane $Z_4$ and the substrate 400 for measuring pose information, the tilted pose of the reference plane of the reference phase is acquired.

Then, after a height $Z_3$ that needs correction to the image-capture part 140 is calculated based on the tilted pose of the reference plane of the reference phase (S320). For example, the height $Z_4$ of the reference plane of substrate 400 for measuring pose information from the ideal reference plane and the height $Z_2$ of the substrate 400 for measuring pose information acquired from a PMP measurement is subtracted to acquire a height $Z_3$ that is needed to correct the reference plane, then a pose of the correction reference plane that applies to the real reference plane may be known.

For example, the height $Z_3$ that is needed to correct the reference plane may be able to know each of the projection parts.

Meanwhile, the substrate for measuring reference phase (first specimen) and the substrate for measuring pose information (second specimen) may be physically formed as an individual substrate, in different, the function for measuring reference phase and the function for measuring pose information may be included in one substrate. Therefore, as one of the systematic correction method of a measurement apparatus, by correcting a reference plane that is a reference of height measurement, a measurement accuracy may be more improved.

The detailed description of the present invention is described with regard to the preferable embodiment of the present invention, however, a person skilled in the art may amend or modify the present invention within the spirit or scope in the following claim of the present invention. Therefore, the detailed description described above and the drawing illustrated hereinafter does not limit the technical idea of the invention.

The invention claimed is:

1. A correction method of a measurement apparatus, comprising:
   acquiring an image by image-capturing a calibration substrate, on which a plurality of patterns are formed, with an image-capture part that has a camera and an image-capture lens;
   acquiring a distance information between the plurality of patterns from the acquired image;
   reading a reference data of the calibration substrate;
   acquiring a pose information of the calibration substrate by using the acquired distance information between the plurality of patterns and the distance information between the plurality of patterns in the reference data; and
   calibrating the image-capture part by using the pose information and the reference data of the calibration substrate,
   wherein acquiring the pose information comprises determining whether a slope of the calibration substrate is positive or negative by comparing sizes of at least two patterns of the plurality of patterns.

2. The correction method of claim 1, wherein the image-capture lens comprises a telecentric lens.

3. The correction method of claim 1, wherein the image-capture part is calibrated by using an average value of calibration data that are acquired by measuring at least two poses of the calibration substrate.

4. A method of correcting a distortion of an optical system of a measurement apparatus measuring a measurement object with an image-capture part by using the optical system having a spherical lens and a non-spherical lens, the method comprising:
   acquiring an image by image-capturing a substrate on which a plurality of patterns are formed; and
   dividing the acquired image into a plurality of sub-regions, and compensating a distortion of each sub-region by applying a different compensating condition for each sub-region.

5. The correction method of claim 4, wherein the non-spherical lens comprises a beam splitter having a plate-shape.

6. The correction method of claim 4, wherein compensating the distortion of each sub-region, comprises acquiring a compensating condition that minimizes the distortion of the sub-region by using pattern-compensating values, the pattern-compensating value corresponding to each of the patterns included in the sub-region.

7. The method of claim 4, after compensating the distortion of each sub-region by a plurality of times while changing a shape of the sub-region,
   wherein the shape of the sub-region is decided based on the acquired compensation data.

8. A correction method of a measurement apparatus, the method comprising:
   measuring a reference phase by measuring a phase of a substrate for measuring the reference phase by using an image-capture part;
   acquiring a tilted pose of a reference plane of the measured reference phase to an image plane of the image-capture part; and
   calculating a height that is required to correct the reference plane with regard to the image-capture part based on the tilted pose.

9. The method of claim 8, wherein acquiring the tilted pose of the reference plane of the measured reference phase to the image plane of the image-capture part, comprises:
   measuring a substrate for measuring pose information by using the image-capture part to acquire a substrate plane of the substrate for measuring pose information;
   measuring a phase of the substrate for measuring pose information to acquire a height based on the reference phase; and
   comparing the substrate plane of the substrate for measuring pose information and the height of the substrate for measuring pose information to acquire the tilted pose of the reference plane of the measured reference phase.

10. The method of claim 9, wherein acquiring the tilted pose of the reference plane of the measured reference phase, comprises:
    calculating a height of the substrate plane from a predetermined ideal reference plane that is parallel with the image plane; and
    acquiring the titled pose of the reference plane of the measured reference phase based on the height of the substrate plane and the height of the substrate.

11. The method of claim 9, wherein acquiring the substrate plane of the substrate for measuring pose information, comprises:
    measuring the substrate for measuring pose information having a plurality of indication marks by using the image-capture part and measuring a distance between the indication marks, to calculate a tilted pose of the substrate for measuring pose information.

12. A measurement apparatus comprising:
    at least one projecting part that provides a pattern-light toward a substrate on which a measurement object is formed;
    an illumination part that provides a light toward the substrate;

an image-capture part disposed on an upper part of the substrate to image-capture the substrate;

a beam splitter disposed between the image-capture part and the substrate to partially reflect the light from the illumination part to face the substrate and partially transmit the light; and a control part dividing the captured image into a plurality of sub-regions, and compensating a distortion of each sub-region by applying a different compensating condition for each sub-region.

13. The method of claim 12, wherein a reflectivity and a transmissivity of the beam splitter being asymmetric, and the transmissivity of the beam splitter is greater than the reflectivity.

14. The method of claim 12, wherein the light exiting the illumination part is reflected by the beam splitter and provided to the measurement object, and a light that is reflected from the measurement object retransmits the beam splitter and enters the image-capture part to form a coaxial lighting system.

15. A measurement apparatus, comprising:

an image-capture part acquiring an image by image-capturing a calibration substrate, on which a plurality of patterns are formed, wherein the image-capture part has a camera and an image-capture lens;

a control part acquiring a distance information between the plurality of patterns from the acquired image, reading a reference data of the calibration substrate, acquiring a pose information of the calibration substrate by using the acquired distance information between the plurality of patterns and the distance information between the plurality of patterns in the reference data, and calibrating the image-capture part by using the pose information and the reference data of the calibration substrate, wherein the control part determining whether a slope of the calibration substrate is positive or negative by comparing sizes of at least two patterns of the plurality of patterns in acquiring the pose information.

16. The correction method of claim 15, wherein the image-capture lens comprises a telecentric lens.

17. The correction method of claim 15, wherein the image-capture part is calibrated by using an average value of calibration data that are acquired by measuring at least two poses of the calibration substrate.

* * * * *